United States Patent [19]
Garton et al.

[11] Patent Number: 5,134,644
[45] Date of Patent: Jul. 28, 1992

[54] DATA COMMUNICATION DEVICE

[75] Inventors: Douglas Garton, Morgan Hill; Gary Prideaux, Los Gatos; Gregory Triplett, Pleasanton; Richard Leggitt, Felton, all of Calif.

[73] Assignee: Senses International, San Jose, Calif.

[21] Appl. No.: 569,894

[22] Filed: Aug. 17, 1990

[51] Int. Cl.$^5$ .............................. H04M 11/00
[52] U.S. Cl. ........................ 379/39; 379/59; 340/539
[58] Field of Search ................... 379/37–40, 379/42–45, 47–51, 59, 60, 63; 455/33, 56; 340/506–508, 533, 531, 539

[56] References Cited

U.S. PATENT DOCUMENTS

| | | | |
|---|---|---|---|
| 3,914,692 | 10/1975 | Seaborn, Jr. | 379/38 |
| 3,925,763 | 12/1975 | Wadhwani et al. | 379/49 |
| 4,228,424 | 10/1980 | Le Nay et al. | 379/42 |
| 4,465,904 | 8/1984 | Gottsegen et al. | 379/42 |
| 4,521,645 | 6/1985 | Carroll | 379/42 |
| 4,577,182 | 3/1986 | Millsap et al. | 379/49 |
| 4,724,425 | 2/1988 | Gerhart et al. | 340/531 |
| 4,868,859 | 9/1989 | Sheffer | 379/39 |
| 4,887,290 | 12/1989 | Dop et al. | 379/50 |
| 4,993,059 | 2/1991 | Smith et al. | 379/39 |

Primary Examiner—James L. Dwyer
Assistant Examiner—Wing F. Chan
Attorney, Agent, or Firm—Douglas A. Chaikin

[57] ABSTRACT

Disclosed herein are two embodiments of an alarm and security system. The first is a stand alone alarm and security system which includes a control panel and at least one transceiver for sending and receiving a control signal and a base station. The control panel receives information about one or more desired conditions in one or more geographical areas and transmits the information to a base station via the transceiver. The base station receives the information from the control panel and transmits the appropriate control signals to the control panel. The second embodiment includes a communications panel including first transceiver for receiving information about one or more desired conditions in one or more geographical areas and for receiving a control signal and for transmitting the desired condition information and a control signal to a base station. Either embodiment accepts information from an existing panel via telephone line and transfers a full data message to the base station.

19 Claims, 12 Drawing Sheets

PART 1

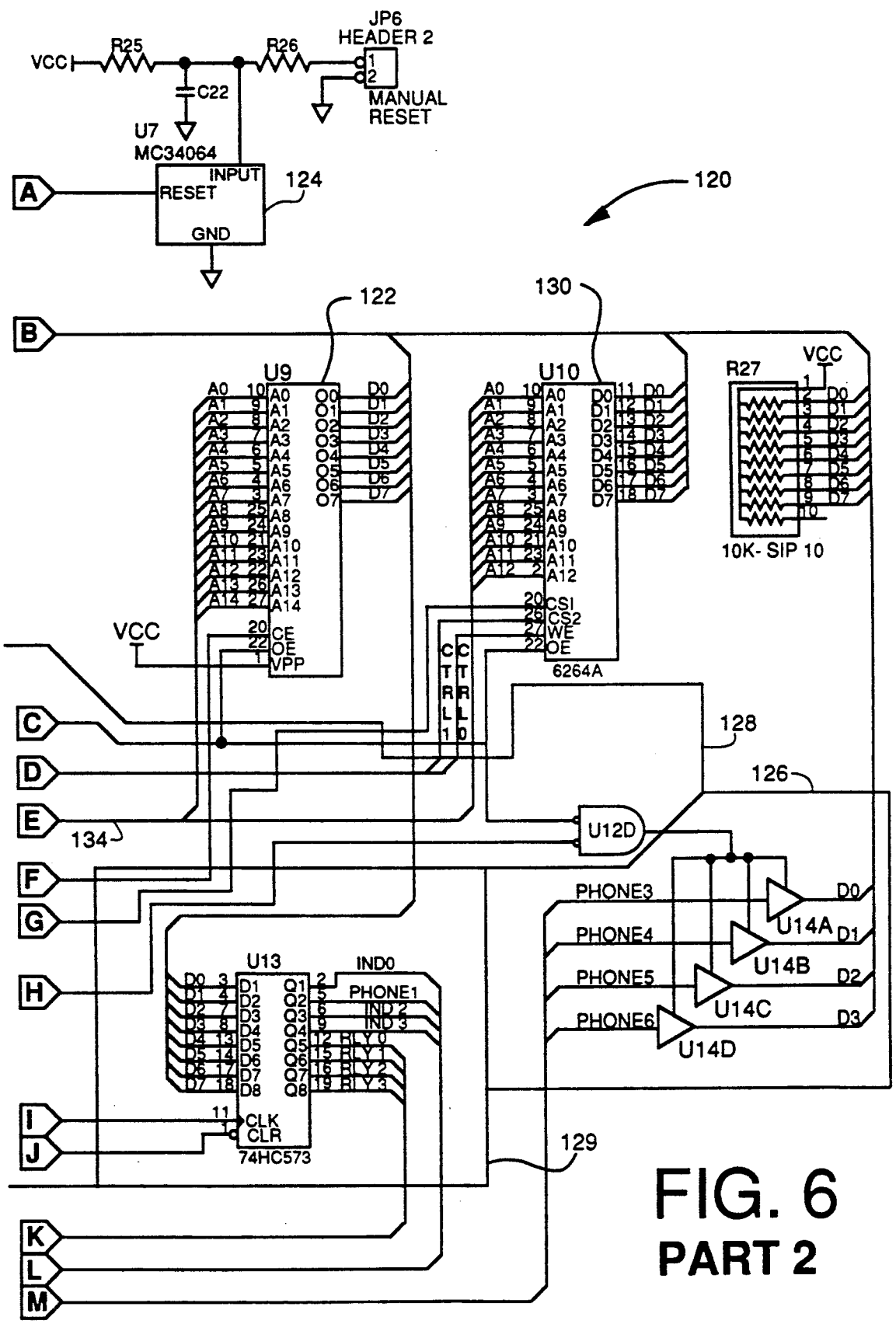
FIG. 6 PART 2

DATA COMMUNICATION DEVICE

BACKGROUND OF THE INVENTION

1. Field of the Invention

This invention relates to alarm and security systems which communicate with a base station and more particularly to such systems which communicate with a base station over a radio frequency and receive information from existing panels which transmit over telephone lines.

2. Previous Art

Alarm and security systems have existed for many years. In fact, there are many such systems which protect commercial and residential buildings today. Most of these systems include a communications panel which is connected to a series of sensors or detectors for gathering information about one or more desired conditions in one or more geographical areas. The panel communicates the gathered information in the form of a digital message to a base station by telephone line.

Typically, the telephone line is the weak link in the security and alarm system. The telephone line is vulnerable to tampering. An intruder can cut the telephone line, place a voltage thereon and trick the panel as to the intruder's presence. Other disadvantages of the telephone line based alarm and security system include the inherent necessity of having a telephone system in place. In many foreign countries and even in remote areas of the U.S. and other developed countries, there are no such telephone systems. Thus, the typical telephone based alarm and security system is useless under those conditions.

Additionally, telephone line based alarm and security systems are quite costly because they required telephone hook-up and considerable hard wiring. And such telephone line based alarm and security systems typically fail during local emergencies such as a power failures (blackouts) and earthquakes.

Additionally, radio reception transmission of condition and control information was not well known in alarm and security systems many years ago. Technology has advanced considerably, virtually obsoleting systems which are incapable of using radio frequency transmissions. This leaves the many thousands of users with such systems of facing the unhappy prospect of purchasing entirely new alarm and security systems.

Examples of existing alarm systems using cellular technology include Millsap et al, U.S. Pat. No. 4,577,182 and Lebowitz, U.S. Pat. No. 4,825,457. Millsap et al discloses an alarm system which uses cellular transmitters to send condition information to a base station. Additionally, Lebowitz discloses the use of cellular network to transmit and receive information. Neither of the above disclosures reveal the use of an existing system in conjunction with their systems.

What is needed is an alarm and security system which can stand on its own and function as a secure system. Such a system should include a panel with the ability to communicate with the base station via either telephone or radio transmission. Additionally what is needed is an alarm and security system which can be used in conjunction with existing panels such that the existing panels can be used compatibly with modern technology.

SUMMARY OF THE INVENTION

It is an object of this invention to provide an alarm and security system which operates using radio frequency as the primary form of communication between a panel and a base station.

It is a further object of this invention to provide such a system which enables an existing telephone operated system to operate using either radio or telephone as the primary form of communication between a panel and a base station.

It is a further object of this invention to provide a stand alone system which operates as described above and which is compatible with existing telephone operated panels.

In accordance with the above objects and those that will be mentioned and will become apparent below, the alarm and security system in accordance with this invention includes:

a communications panel including first transceiver means for receiving information about one or more desired conditions in one or more geographical areas and for receiving a control signal and for transmitting the desired condition information and a control signal over a predetermined radio frequency, the communications panel additionally including means for receiving the condition information over a telephone line; and a base station, including second transceiver means for receiving condition information and a control signal and for transmitting information and a control signal to the communications panel, whereby, the base station and the communications panel are in two-way communication.

An additional embodiment of the alarm and security system in accordance with this invention comprises a stand alone embodiment, includes:

a control panel, a communications means for sending and receiving a control signal and a base station;

the control panel including means for receiving information about one or more desired conditions in one or more geographical areas;

means connecting the control panel and the communications means for enabling the control panel to communicate its condition information to the communications means;

the communications means including first transceiver means for transmitting the desired condition information to the base station over radio frequency and for receiving a control signal from the base station; and the base station including second transceiver means for receiving condition information and for transmitting a control signal to the control panel, whereby, the base station and the communications means are in two-way communication.

Prior to sending the information to the base station, the preferred embodiments of the system in accordance with this invention package the information in the form of a proprietary message. The form of the proprietary message is defined by a unique protocol known only by the particular system. One commonality to each unique protocol is an end to end acknowledge in each message.

It is an advantage of this invention to provide an alarm and security system which can work compatibly with existing telephone operated panels to prevent such existing panels from becoming obsolete.

It is an additional advantage of this invention to provide a stand alone alarm and security system which includes the ability to accept existing panels.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

Figure 1:
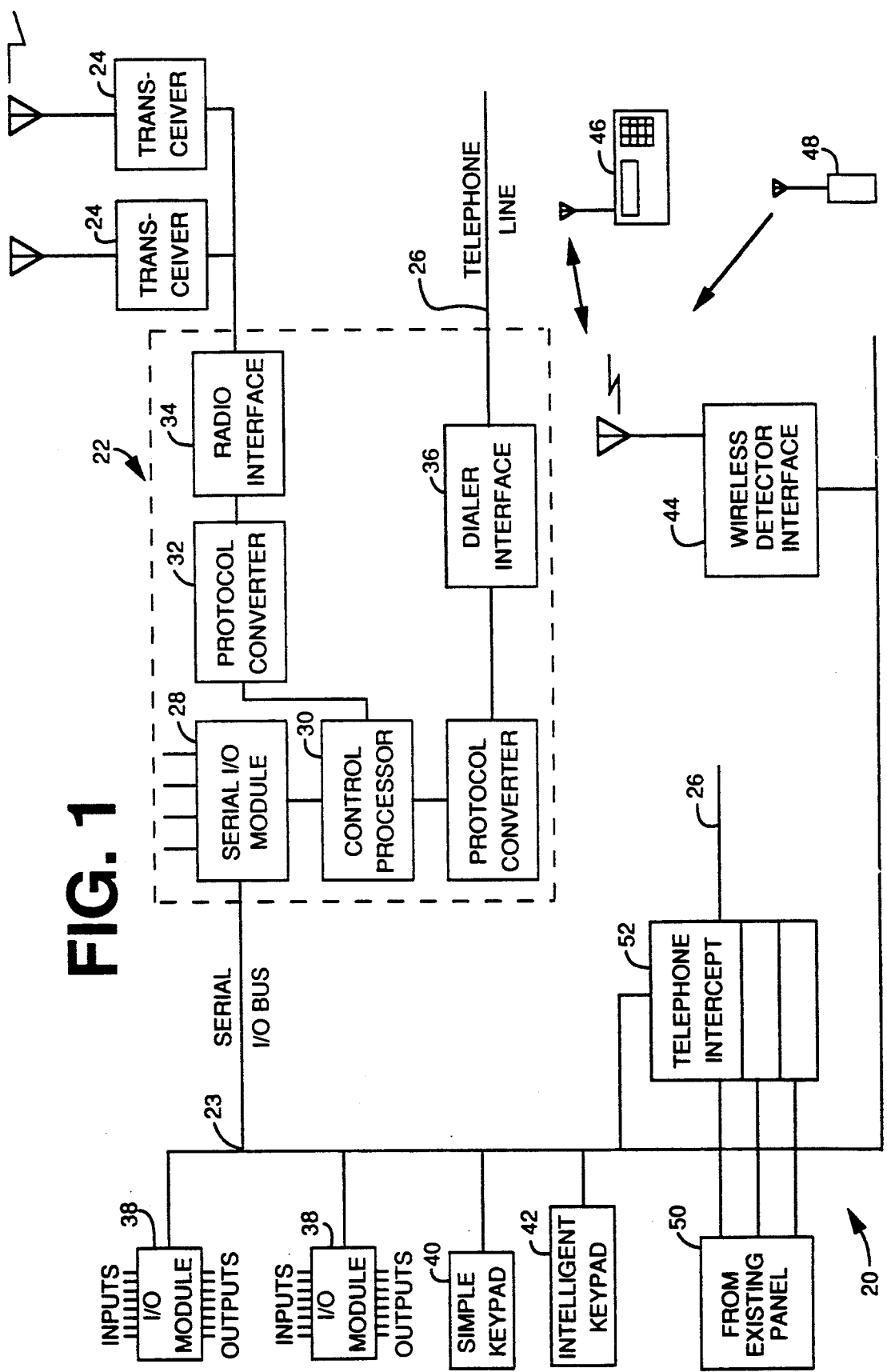
FIG. 1 is a schematic representation of a control panel and ancillary devices for the stand alone security system in accordance with this invention.

As set forth above, conventional security systems include a reporting source, a base station and a panel for reporting the source information to the base. The invention described below utilizes these basic elements and incorporates the ability to modularize the elements so that both an existing system and a stand alone system may be constructed utilizing advanced technology. The invention will now be described with respect to FIG. 1 which illustrates an overview of a preferred embodiment of the control panel of the stand alone alarm and security system in accordance with this invention, denoted generally by the numeral 20.

The stand-alone system 20 includes a serial communications processor 22. The serial communications processor 22 includes a serial input/output module 28. The serial input/output module 28 receives information about one or more desired conditions in one or more geographical areas from the sources shown in FIG. 1, including specific sensor sources denoted in FIG. 1 as module inputs and outputs 38, simple keypad 40, intelligent keypad 42, an existing communication panel 50 (via telephone intercept 52), and a wireless detector interface 44.

The serial input/output module 38 converts the information to a binary format and sends the information in a bit stream form to the serial communications processor 22.

Figure 5:
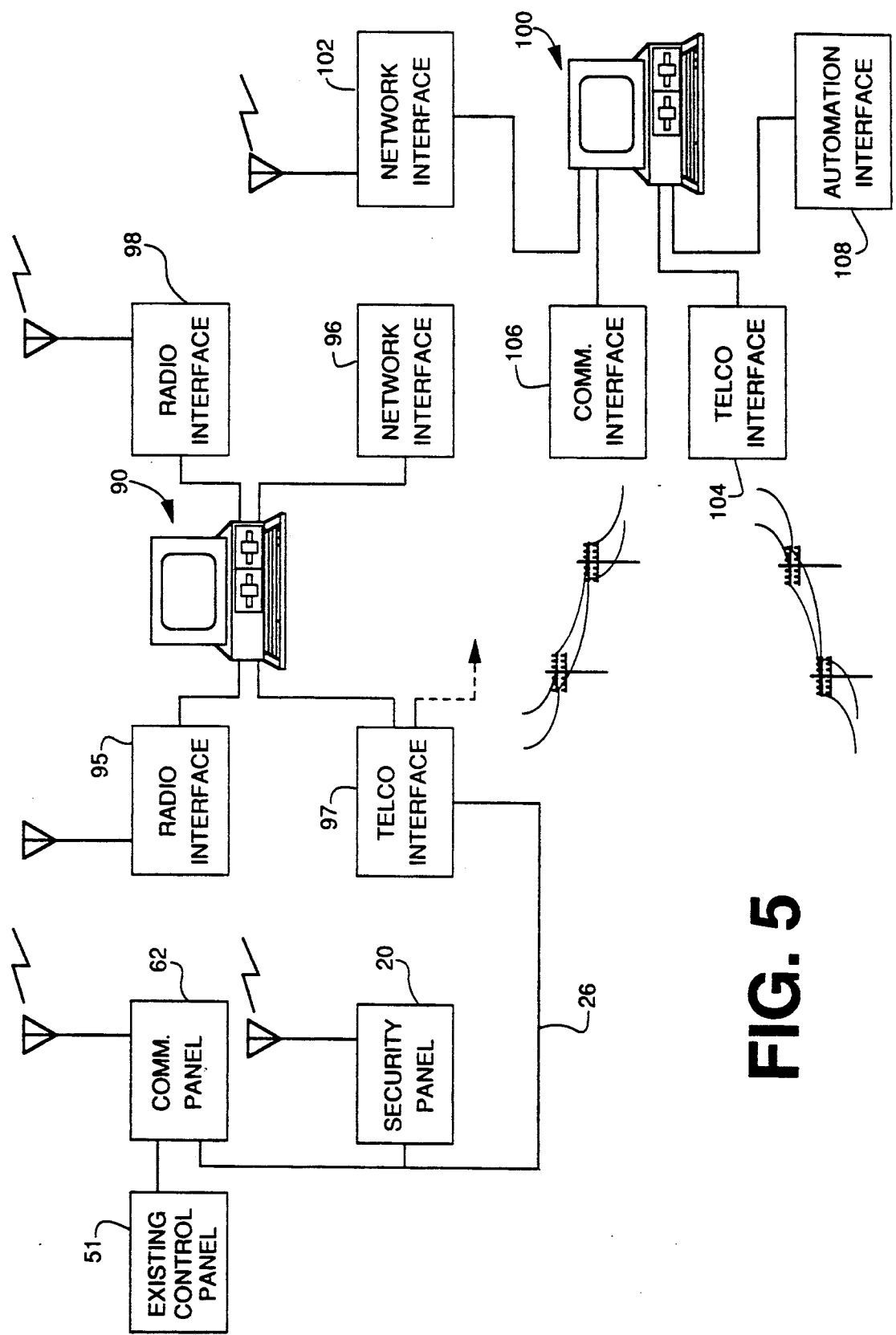
FIG. 5 is a schematic illustration of an overall network for a security system in accordance with this invention.

The serial input/output module 28, of the serial communications processor 22, converts the source information into a digital byte stream (8 bits wide) to facilitate efficient processing of the byte stream. As explained in detail below, the serial communications processor 22 processes the information so received and sends the information to a base station 100 (FIG. 5).

The serial communications processor 22 includes a control processor 30 for processing a digital byte stream, a protocol converter 32 for receiving the processed digital byte stream and packaging the digital byte stream into a message in the proper format for transmission, and for decoding a message received from the base station 100 and sending the received message to the control processor 30 in the form of a digital byte stream, a radio modem interface 34 for converting the digital byte stream into an analog stream for messages transmitted via a radio to the base station 100, and for converting an analog stream from the base station 100 into a digital byte stream and a dialer interface 36 for alternatively sending messages to the base station 100 via telephone line 26.

The control processor 30 includes a microcontroller such as a Motorola 6800 series microcontroller and more specifically a Motorola 68HC11. The microcontroller circuit 120 will be described in detail below with respect to FIG. 6.

The protocol converter 32 conditions the digital byte stream and converts it to a proprietary message using a predefined protocol. The predefined protocol is unique to each network (A network will be explained in detail below.) The proprietary message comprises bytes of data having predefined fields including: the message from the sources themselves, the device identification number sending the message, a control byte, the power status of the serial communications processor 22 and cyclic redundant checksum or CRC information.

The information portion of the message (information about one or more desired conditions in one or more geographical areas) comprises the single largest field and may be as large as 255 bytes. For example, a sensor may have detected that the southwest door of a particular building has been opened. This information is part of the message to the base station.

Each device in the system is given a unique identification number. In this way each serial communications processor 22 can be identified throughout the system without confusion even when multiple serial communications processors are reporting or receiving information.

The control byte contains message sequence numbers and protocol status information.

The CRC byte is the cyclic redundant checksum and provides message verification.

As the system grows into a network, the message is modified to contain routing information for each network controller so that individual control panels 20 may be addressed through network repeaters and controllers as will be more fully appreciated with respect to FIG. 5.

The power source for the serial communications processor 22 will often include a battery as a backup in the event of a power failure. The status byte tells the base station the status of the power level of the battery. For example, a particular serial communications processor 22, assigned a unique identification number, will report its message information and within the protocol of the entire message is the status byte which tells whether the particular serial communications processor 22 is low on power. This byte is read by the base station 100 which sends a message to the operator who can then take the appropriate action.

The security system 20 includes a pair of transceivers defining redundant transceivers 24. Each transceiver operates at a different frequency so that if there is static or noise on one channel another channel may be used with satisfactory results. Alternatively, the transceivers 24 may operate on the same frequency in case of failure of one of the transceivers 24. The transceivers 24 transmit at the preferred rate of 29,000 baud. Additionally if one of the redundant transceivers 24 fails, the other transceiver automatically sends or receives the message. It will of course be appreciated that a single transceiver embodiment is well within the scope and spirit of the security system 20. In fact, it would be expected that a user having redundant transceivers 24 would eliminate the telephone line 26 hook-up to save on costs. In those cases where a telephone line 26 was still active, a single transceiver would most likely be used. It will be appreciated that the transceivers 24 may communicate with the base station or intermediate stations via spread spectrum.

The user may select either the radio or the telephone line 26 as the primary form of communication with the base station 100. If the user selects the radio as his primary means of communication with the base station, a relay is switched in the control processor 30 so that a conditioned, digital byte stream is sent to the radio modem interface 34.

Should each of the redundant transceivers 24 fail or prove to be unreliable (too much static on the channel for transmission and reception), the control signal as well as the other information in the transmitted message will be sent to the base station 100 because the relay automatically switches to the telephone line 26 as will be explained below with reference to FIG. 6.

Of course, the user may wish to have the telephone line 26 be the primary communications link between the serial communications processor 22 and the base station 100. If so, the relay is set so that the entire conditioned digital byte stream is directed to the telephone line 26. Should the telephone line 26 fail, the control processor 30 may be programmed to either switch the relay to the radio transmission or to send out a communications failure signal, causing alarms to sound or otherwise alert users at the sources of the problem.

When the telephone line 26 is selected as the desired method of communication, the control processor 30 instructs the dialer interface 36 to dial the appropriate number for the base station to complete the sending of the conditioned proprietary message. The control processor 30 may also instruct the dialer interface 36 to dial a particular base station 100 upon the occurrence of a predefined event(s). For example, upon the occurrence of the appropriate event, the dialer interface 36 is instructed to notify the appropriate base station 100 and the operator at the base station contacts the appropriate facility.

The input/output modules 38 receive inputs from sensors which sense door openings and door closings or smoke detectors or various other kinds of detectors. Additionally, the modules 38 may include inputs from sensors designed to check a particular geographic area for movement by utilizing an infrared detector at a number of input/output modules 38. In addition to communicating information relative to door openings and closings or smoke, the sensors also communicate information relative to their individual identification.

An additional input to serial input/output bus is the simple keypad 40. The simple keypad 40 can disarm the security system 20 to allow admittance of a user upon the entry of the correct pass code.

Another source for the serial input/output bus is an intelligent keypad 42. The intelligent keypad 42 includes an alphanumeric display and can be programmed to allow control information to reach the control processor 30 providing the user has a high enough priority determined by his pass code.

Still an additional source of data to the serial communications processor 22 is a wireless detector interface 44. The wireless detector interface 44 receives information from an intelligent keypad 46 or various wireless detectors represented schematically by box 48. Such wireless detectors include fire, smoke and the like.

If a number of detectors such as 46 and 48 are desired to be used, it is preferred to use spread spectrum radio frequency technology for the transmission and reception of data for the wireless detectors. Using spread spectrum technology, there will be very little likelihood of interference between local sensor transceivers and thus, a great many sensors are capable of being used.

Additionally, the serial communications processor 22 receives information from existing alarm panels 50 through a telephone intercept 52. The telephone intercept 52 intercepts the signal from the existing panels 50 so long as the relay is appropriately set to switch from the telephone line 26 to the serial communications processor 22. The telephone intercept 52 can be switched on or off as desired from base station 100. The telephone intercept 52 is transparent to existing panel 50 and the integrity of the existing panel 50 is unaffected by the telephone intercept 52.

The ability of the serial communications processor 22 to receive data from a telephone intercept 52 allows an existing panel 50 to communicate with the base station 100 by more reliable and adaptable systems such as those of the present invention. It is of particular importance in various commercial settings, such as proprietary complexes and high risk applications in which the installed equipment base would be too costly or inconvenient to replace or update.

For example, in a shopping center, there may be one store having 15 alarm panels internally. All of these existing panels 50 are hard wired into one serial communications processor 22. The serial communications processor 22 is connected to a local base station defining a proprietary base station within the shopping center which may have a security force only during certain hours e.g. 7 a.m. to 11 p.m. During unattended times, the local base station sends the messages to a non-proprietary base station or alternatively, the serial communications processor 22 sends the messages to the non-proprietary base station.

The above system also provides a full data transfer and not just summary information as in the existing systems it updates. The complete message is transferred to the remote (non-proprietary) base station including location and type information (not merely an indication that an alarm has sounded). And finally, during attended hours, the above system provides a proprietary message.

The data collected by the serial communications processor 22 is sent via radio instead of being sent over a telephone line 26, when desired. Thus, the existing telephone line-type alarm panels 50 are enabled to use the more modern and secure technology of the system 20 without any substantial modification.

Additionally, more than one existing panel 50 may be hooked to the serial input/output bus 23 via the telephone intercept 52 in order to share transceivers 24 as shown in FIG. 1 to reduce costs. This dramatically decreases the cost of each unit because a number of existing panels 50 share the same transceiver and related circuitry.

Figure 2:
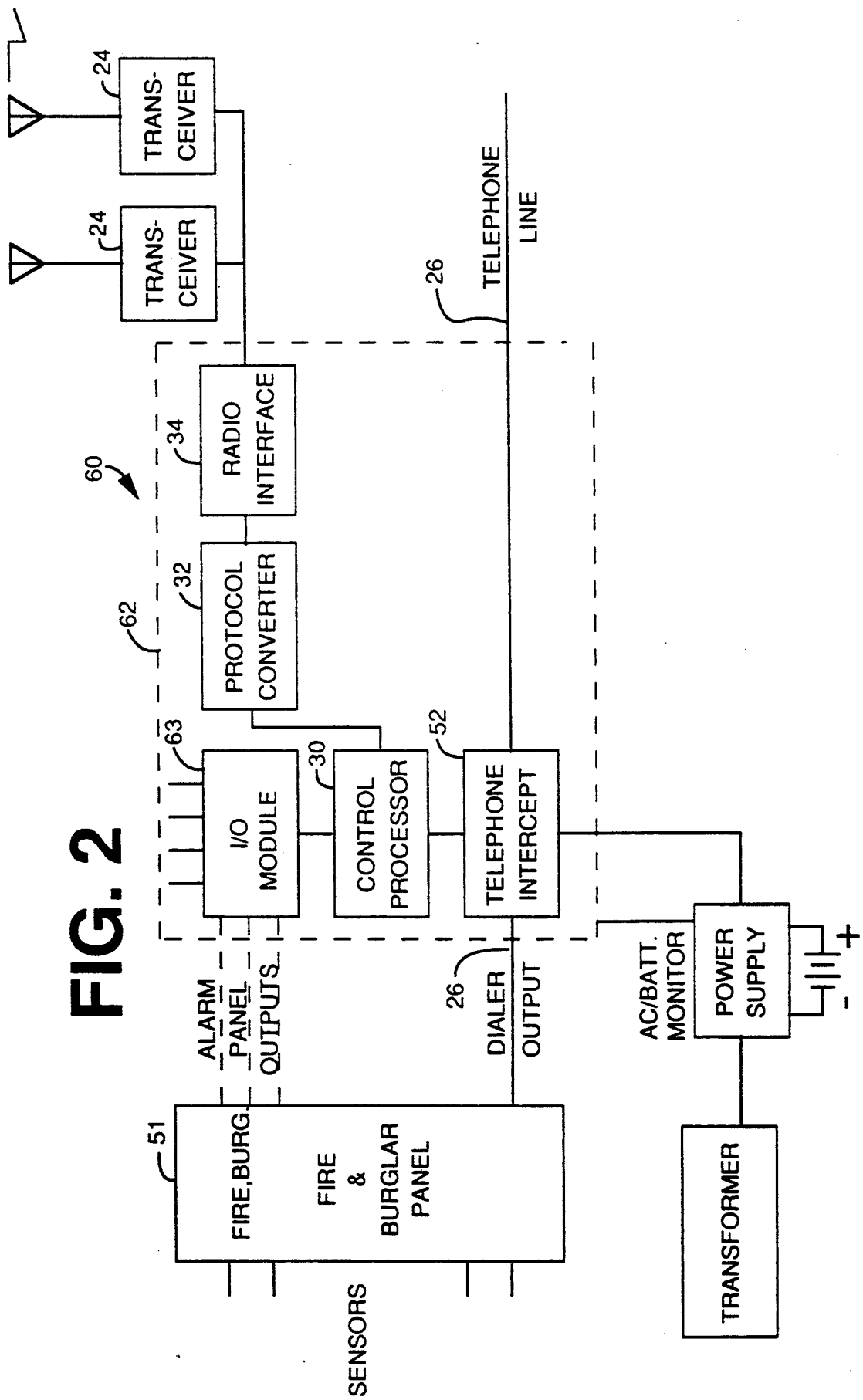
FIG. 2 is a schematic representation of a communications panel for an existing security system in accordance with this invention.

FIG. 2 illustrates, in schematic, a second embodiment of the alarm and security system in accordance with this invention and is generally denoted by the numeral 60 for use with an existing alarm panel 51.

The system 60 includes a communications panel 62. The existing alarm panel 51 is connected to the communications panel 62 and sends information about one or more conditions in one or more geographical areas to the communications panel 62. After receiving the information, the communications panel 62 either generates a suitable message for transmission of the information to the base station 100 via radio waves or alternatively, allows the information to pass to the base station 100 over the telephone line 26.

The existing panel 51 sends raw data to the communications panel 62 from at least two sources, namely the alarm panel outputs and/or the dialer output of the existing panel 51. The raw data is unconditioned, however it is the full message and not mere summary information so that the embodiment of the system 60 also provides full data transfer. In either case, the communications panel 62 does not further process the data, but rather passes the information to a base station as it was received from the existing panel 51.

The communications panel 62 includes the similar elements as serial communications processor 22. However, while the serial communications processor 22 processes information and decides whether alarm information is passed to the base station 100, the communications panel 62 does not make decisions or provide such additional information. The communications panel 62 can not decide to edit or delete such information, it merely sends the information to the base station 100. Alternatively, the communications panel 62 sends the information to the base station unimpeded. With the exception that the signals from the input/output 63 may be turned off.

The stand alone alarm system 20 of FIG. 1 acts as a filter and prevents unmonitored event messages from reaching the base station 100. For example, if serial communications processor 22 receives information that the front door of a building is opening and closing during business hours, it will not pass along such information. This saves radio air time and assists in keeping the entire system free flowing. Additionally, operator time at a base station is saved because these unmonitored event messages are never received and therefore do not need to processed or handled.

The communications panel 62 receives the dialer output information from the existing panel 51 through the telephone intercept 52. If desired, a relay is switched in the telephone intercept 52 such that the information flows unimpeded through the communications panel 62 over the telephone line 26.

On the other hand, the relay in the telephone intercept 52 may be switched such that the information is sent over radio. When the relay is set for radio transmission, no information is sent over the telephone line 26. The raw data from the dialer output is sent to the control processor 30 for packaging as a message.

The protocol converter 32 converts the raw data to a message and sends the message to the radio modem interface 34 for transmission to a base station over redundant transceivers 24. The same procedure applies when raw data is received from the alarm panel outputs directly through the input/output module 63. The raw data is passed through the communications panel 62 and made into a message for radio transmission using the protocol converter 32.

As described with respect to security system 20, the operator may choose either radio or telephone transmission. If the operator chooses radio transmission and the radio fails, the security system 60 automatically resets the relay in the telephone intercept 52 so that the information is communicated to the base station over the telephone line 26.

The security system 60 includes both AC power and a battery backup. These are shown schematically in FIG. 2. A power monitor allows the operator to inspect the system to determine its mode of operation. The monitor also provides an indicator to tell the operator when the batteries are too low for safe operation. This information is also sent to the base station 100 for appropriate action. It will be appreciated that the control panel may additionally operate as a polling means for polling each of the sensors at timed intervals. It will further be appreciated that the polling means may be adapted to be manually overridden through the use of a control signal like the one described earlier and below.

Figure 3:
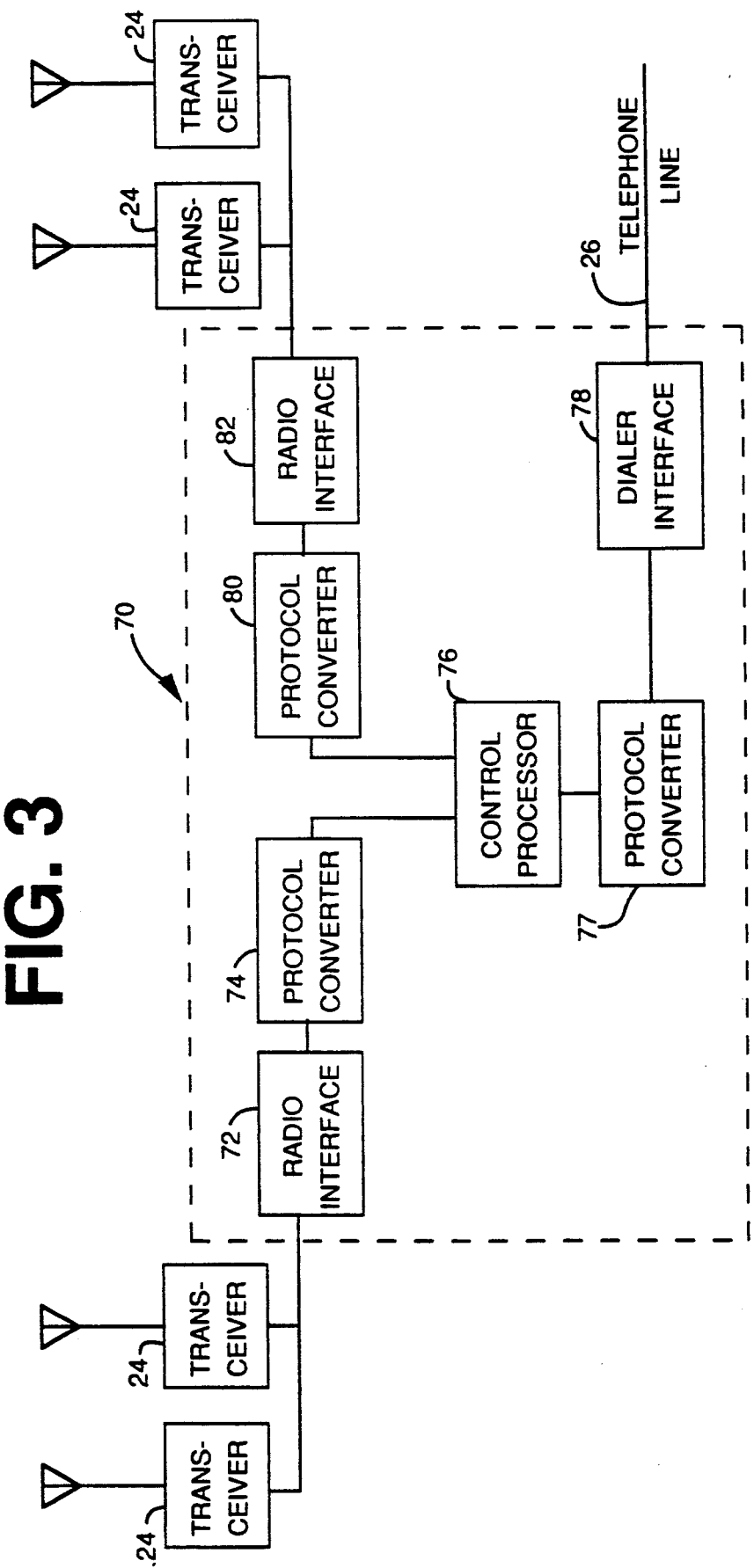
FIG. 3 is a schematic representation of a cluster controller in accordance with this invention.

FIG. 3 illustrates in schematic form, a cluster controller in accordance with this invention, generally denoted by the numeral 70. The cluster controller 70 receives information from communications panels 22 and 62 and the like for transmission to the base station 100 or network controller as will be more fully appreciated with respect to FIGS. 4 and 5 and the description relating thereto. It will further be appreciated that the cluster controller 70 may receive information from sources other than communications panels as long as the information is sent to the cluster controller 70 with the correct radio protocol for the particular system.

For the purposes of illustration only, the cluster controller 70 will now be described with respect to receiving the proprietary message received from the serial communications processor 22. The cluster controller 70 includes redundant transceivers 24 for receiving the proprietary message from the serial communications processor 22.

The cluster controller 70 further includes a radio interface 72. The radio interface 72 converts the radio message from the serial communications processor 22 into a digital byte stream in the encoded radio protocol for that system. Once the radio message is converted to a digital byte stream, a protocol converter 74 decodes the digital byte stream for analysis by a control processor 76.

The control processor 76 determines whether the signal received is of the type that is suitable for transmission to the base station 100. If the acceptance criteria established by the protocol information of the message received are not met, the message will not be forwarded. And, the cluster controller 70 will await receipt of the next message. If all of the necessary protocol information is found in the message, the message will be forwarded by the control processor 76. As with the communications panels 22 and 62, discussed earlier, the message may be forwarded either by radio or the telephone line 26 as desired.

If it is desirable for a message to be sent via the telephone line 26, the control processor 76 passes the digital byte stream to a dialer protocol converter 77. The dialer protocol converter 77 converts the digital byte stream to a proprietary message and passes it to a dialer interface 78. The dialer interface 78 converts the digital byte stream to a form suitable for a telephone message. The dialer interface 78 places the telephone message on the telephone line 26 for forwarding.

If it is desirable to send the message over radio, the control processor 76 passes the digital byte stream to a radio protocol converter 80 for conversion of the digital byte stream into a proprietary message.

After forming the proprietary message, the radio protocol converter 80 sends the message to a radio interface 82. The radio interface 82 receives the proprietary message from the protocol converter 80 and converts the message to proper form for transmission over redundant transceivers 24.

It will be appreciated that the digital byte stream is either sent to the dialer interface 78 or the radio interface 82, but not both. If an alarm message was received by a base station by both the radio and telephone, it is quite possible that the police or fire department would be notified twice, which of course, would be unnecessary.

Figure 4:
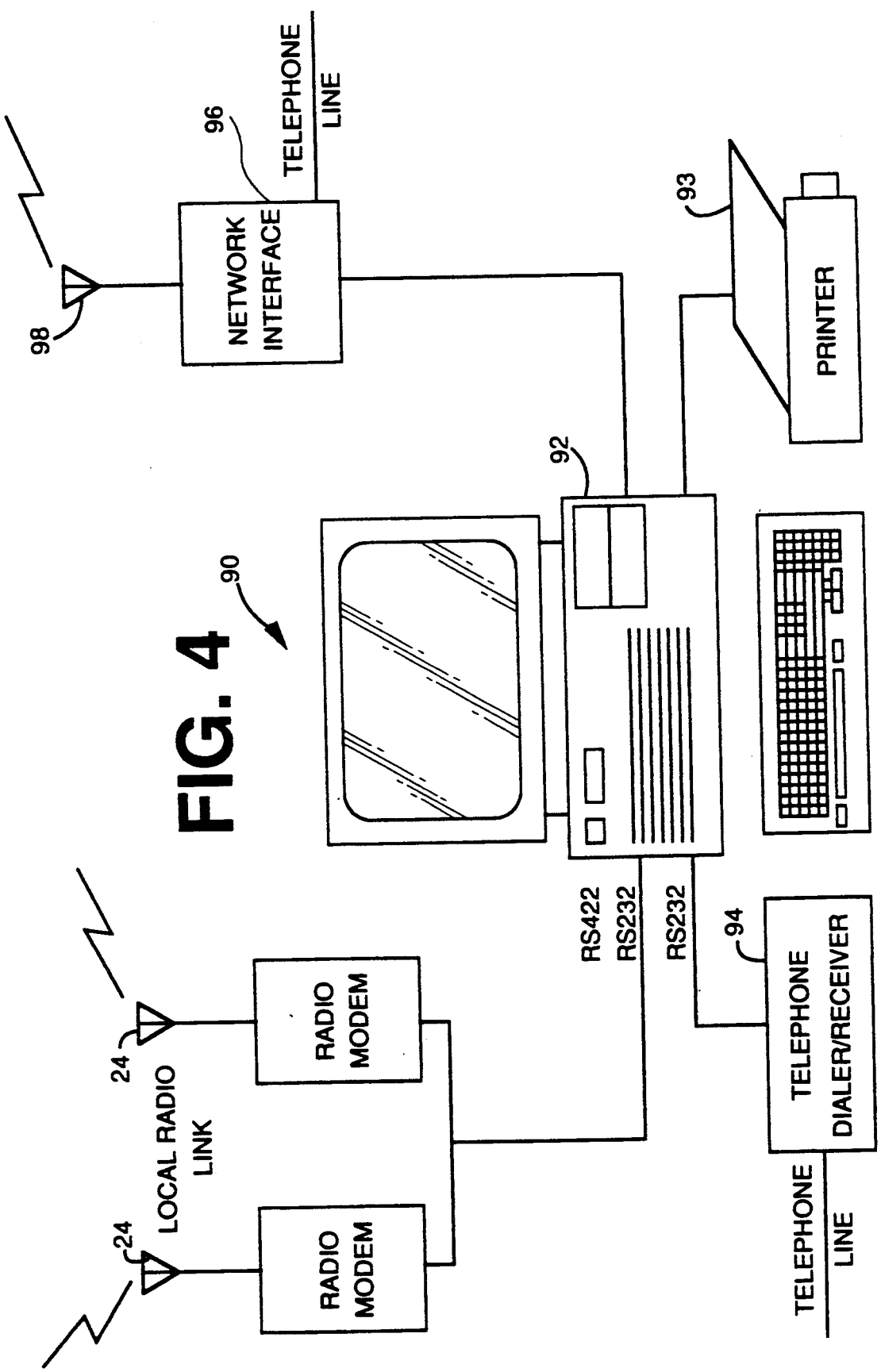
FIG. 4 is illustrates a network controller—base station in accordance with this invention.

With respect to FIG. 4, there is shown a network controller generally designated by the numeral 90. The network controller 90 is a link between local communications panels and distant base stations as is more clearly shown in FIG. 5. The network controller 90 acts as a single node in the overall network shown in FIG. 5. And, multiple network controllers 90 can be placed at various positions in the network to serve as alternative base stations as described above and as will be more fully appreciated with respect to FIG. 5 and the description thereto.

With respect again to FIG. 4, the network controller 90 includes redundant transceivers 24 for receiving information from local communications panels such as 22 and 62 and the like. The redundant transceivers 24 are connected to a PC-type computer 92 with a video display terminal (VDT), such as an IBM-compatible which uses an 80286 microprocessor. The information from the redundant transceivers 24 can be displayed on the VDT and/or stored in a data base within the computer 92, and/or printed on a printer 93 or forwarded to a base station 100 via a network interface 96.

The network controller 90 also includes a telephone dialer and receiver 94 connected to the telephone line 26 for receiving and sending telephone messages.

The message from the communications panel 62 is received by the computer 92 at its serial port, such as an RS232 port. The message may be viewed by an operator on the VDT of the computer 92 when it is acting as a base station 100. The operator takes the appropriate action depending on the message received. For example, the operator may cause the police or fire department to be notified and/or make adjustments in the parameters of the security system from which the message was received. The parameters may be adjusted by sending back a control signal to the appropriate communication panel either via the radio or the telephone line 26.

Additionally, the network controller 90 includes a network interface 96 which either converts the digital byte stream to a form suitable for transmission over the telephone line 26 or via the redundant transceivers 24.

A message sent over the radio is passed to a powerful transceiver 98 which is capable of long range transmissions over great distances. Such messages are received by base stations which receive messages from many such network controllers. Although not shown, the network controller 90 may send the message to a distant base station over satellite to achieve even greater reach.

FIG. 5 illustrates the existing panel 51 and the security system 20 connected to the entire network. The existing panel 51 is connected to the communications panel 62. As shown, both the security system 20 and the communications panel 62 are capable of sending and receiving messages either by radio or the telephone line 26.

The communications panel 62 and the security system 20 both send their messages to and receive messages from the network controller 90. As shown in FIG. 5, the network controller 90 receives the messages either by radio or the telephone line 26 at a radio interface 95 or a telephone interface 97. The network controller 90 repackages and sends the messages to the base station 100 via radio or telephone line 26.

The radio interface 95 may be substituted for several different interfaces depending upon the desired means of connection with the entire network. The radio interface 95 is an example of the network interface 96 and may comprise, for example, a leased line interface or an automation interface 108 as well.

The base station 100 includes a network interface 102 and a telephone line interface 104 for receiving and sending signals. Additionally the base station includes communications interface 106 for sending and receiving messages from to and from leased lines, satellites and the like and automation interface 108 for sending information to a security company automation mini computer.

It will be appreciated the cluster controller 70 (shown in FIG. 3) may be substituted for the network controller 90 shown in FIG. 5. Additionally, a radio repeater may be substituted for the network controller 90 shown in FIG. 5. Likewise, the network controller 90 may function as the base station 100. This does not alter the effectiveness of the system, but rather increases the number of nodes in the overall network.

The approximate distance between the first node (communications panels 62 and security panel 20) and the second node (network controller 90 or cluster controller 70 or a radio repeater) is approximately five to fifteen miles. The approximate distance between the second node (network controller 90 or cluster controller 70 or a radio repeater) and the third node (base station 100 or network controller 90) is as much as several hundred or even several thousand miles.

With respect to FIGS. 6-11, the invention will now be described with respect to the electrical circuit schematics.

Figure 6:
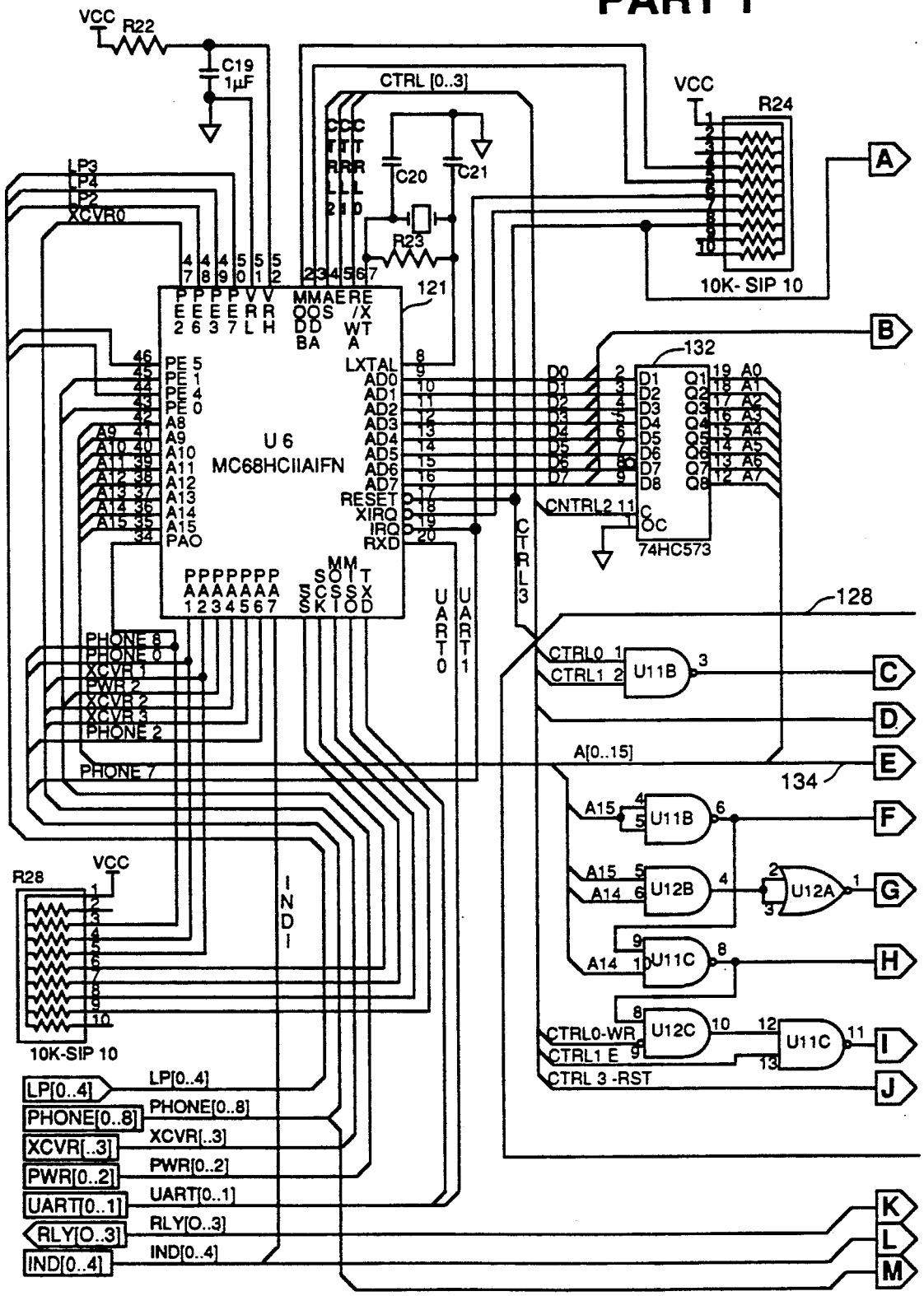
FIGS. 6a and 6b are an electrical schematic of the microcontroller circuit in accordance with this invention.

With particular reference to FIG. 6, there is shown the control processor electrical circuit schematic generally by the numeral 120. The control processor 30 (shown in FIG. 1) includes a microcontroller 121, which as described above, is a Motorola 68HC11 in the preferred embodiment of the invention. The microcontroller 121 includes a microprocessor, input/output capability, RAM memory and $E^2ROM$.

The microcontroller 121 includes input/output latches PE0-PE7 and PA1-PA7 as well as additional input/output latches SS, SCK, MOSI, MISO, TXD, RXD, IRQ, XTRQ; address lines A8-A15, data address lines D0-AD7; control lines MODA, MODB, AS, E, R/W.

E²ROM stores data which is critical to the operation of the system, such as panel address, polling interval, input, input/output module 63 configuration, and existing panel configuration. The critical data is stored in the E²ROM since the E²ROM will not lose its memory in the event of a power failure.

Additionally, the control processor 30 includes external memory, an EPROM 122. A ROM may be substituted for the EPROM 122 to save costs.

The control processor 30 includes a communications RAM 130 and a bus 134 for interconnecting a RAM 130 with the microcontroller 121. The RAM 130 stores the temporary operational information for the security and alarm system 60. This information includes: the return addresses; last voltage level of the inputs; telephone intercept messages; temporary status changes; control processor 30 operational data; or any other information which is alterable during normal operation. Information which must remain after a power failure, and is not subject to change during normal operation, is stored in the E²ROM of the microcontroller 121.

The control processor 30 includes a latch 132 which captures and holds address information from the communications bus 134, and is selected by the control processor 30.

Additionally, the control processor 30 includes a reset 124 which monitors the power of the microcontroller 121. If the communications panel 62 experiences a power failure, the reset 124 will force the communications panel 62 into an idle state before it can contaminate the entire network.

Once the power is restored to the communications panel 62 it must be reset before being activated. The reset 124 resets the communications panel 62. These circuits thus comprise a power-ON reset with a pushbutton for optional manual reset.

The control processor 30 includes an input latch 126 for converting decoded DTMF (dual tone multi-frequency tone) digital signals into a microcontroller 121 compatible digital signal. The control of the input latch 126 is connected to an address decoding member 128. The address decoding member 128 selects a range of addresses placed on the communications bus 134 by the microcontroller 121. When the microcontroller 121 reads that address, the DTMF signal is loaded into the microcontroller 121 for processing. When the microcontroller 121 writes to that address, relay, phone and indicators are controlled by the output latch 129.

The microcontroller 121 is controlled by firmware which resides in the EPROM 122. The data is addressed by the microcontroller 121 and stored therein. The microcontroller 121 receives instructions from, the EPROM 122 for processing the data, in a normal instruction-fetch cycle.

The technique of multi-tasking is employed by the firmware. The firmware comprises three separate functions; the change task module; a command processor module and a phone module. The modules function and communicate with each other as described below.

The change task portion of the firmware detects changes on inputs to the microcontroller 121; measures the battery inputs, e.g. the voltage levels; keeps track of the relay in the control processor 30 used to send the message over the radio or the telephone line 26; controls the set of relays 232; and in general maintains all of the low level input and output of the microcontroller 121.

The low level input and output of the microcontroller 121 includes the telephone intercept state and battery test status.

The change task module also keeps track of the current relay status, the battery-level as well as the AC-power state, radio-link state and trouble-indicator buzzer 242.

The command processor portion of the firmware handles new incoming radio messages, and formats new outgoing radio messages based on this data. The command processor communicates with the change task module over data buffers located in the RAM 130. When a change is detected by the change task portion of the firmware a control flag is set in RAM 130. The command processor reads the control flag in RAM 130 and recognizes that a change has been made. A new message is then made and sent to the appropriate line for transmission via redundant transceivers 24. Similarly, the command processor receives messages, checks to make sure that the message is a valid one and then sends instructions as appropriate. For example, if a message is received to activate a particular relay, the change task module will detect this request as a change and notify the command processor of the request. The command processor will check to make sure that the message is valid and meant for the particular communications panel and then the particular relay is activated.

The command processor keeps track of the identification bits, the current CRC for that message as well as the data encryption key to allow decoding of messages.

The phone module interfaces with the communications panel 62 and instructs the communications panel 62 to alert the base station 100 that a telephone message is being received. The phone module is alerted that a telephone message is being received by the command processor which was notified by the change task module when it detected that a telephone call had been detected. The phone module instructs the command processor to send an acknowledge, that the telephone message has been received and an ACK tone is then sent to the existing panel 51.

The phone module also keeps track of the number of pulses received so far, how also many digits have been received, and what the checksum is. This information is stored in the RAM 130 which is connected to the EPROM over communications bus 134.

Figure 7:
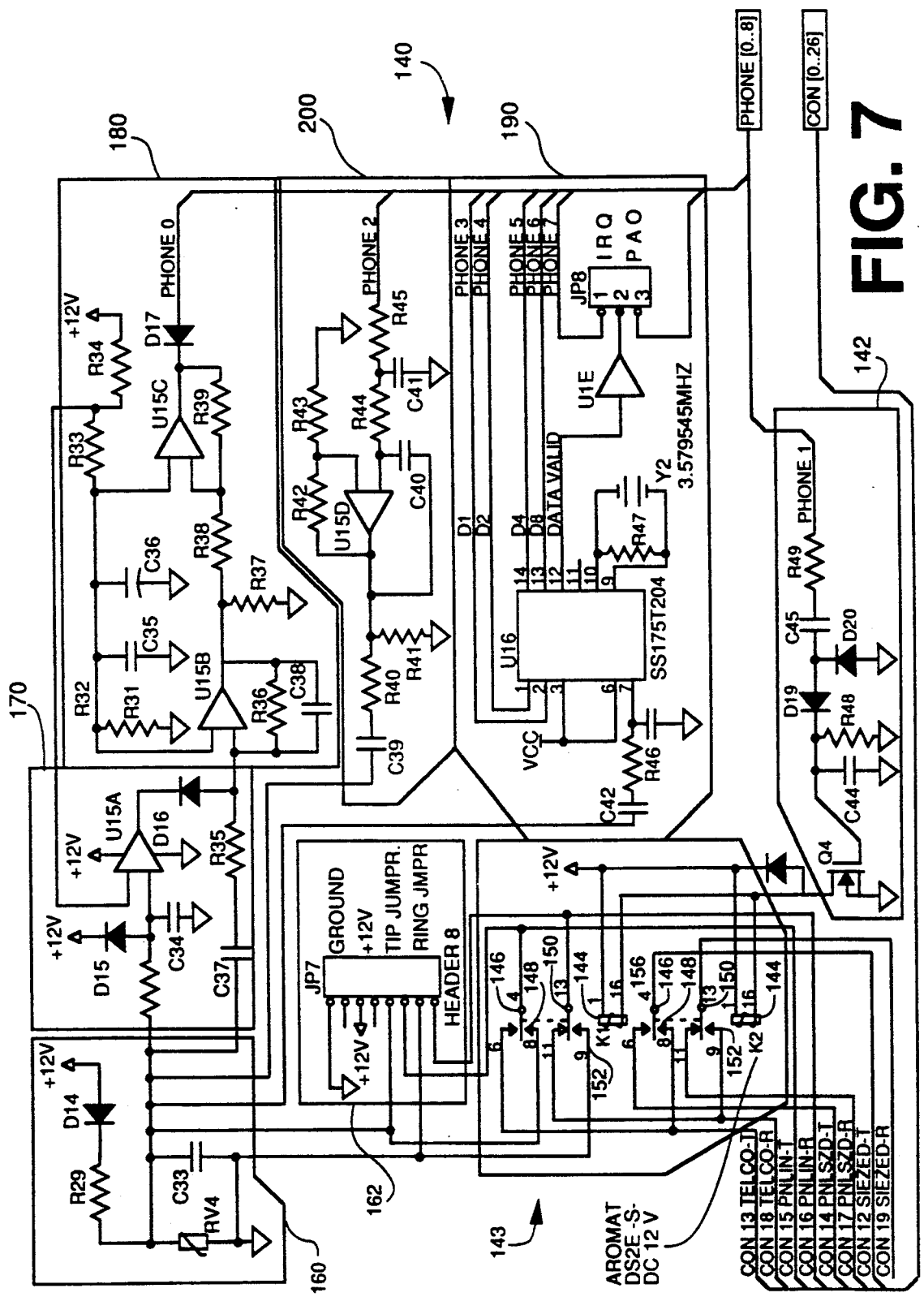
FIG. 7 is an electrical schematic of a telephone interface circuit in accordance with this invention.

With particular reference to FIG. 7, there is shown the telephone interface circuit generally indicated by the numeral 140. The telephone interface circuit 140 intercepts or allows the message from the dialer output from the existing panel 51 to pass unimpeded. The telephone interface circuit 140 includes a watchdog timer 142 for verifying operation of the microcontroller 121 by monitoring a stream of pulses produced by an operational microcontroller 121; a set of relays 143 for directing the message to either the radio or the telephone line 26; a telephone line simulator 160 for simulating a telephone line connection for the existing panel 51 when messages are sent to the communications panel 62 via the telephone line 26; a seize-detect circuit 170 for sensing when the existing panel 51 is making a telephone call; a pulse tone receiver 180 for receiving a pulse tone message from the existing panel 51; a DTMF (touch tone) receiver 190 for receiving a DTMF message from the existing panel 51; and a control tone transmitter 200 which transmits an ACK tone to the existing panel 51.

The control processor 30 includes a set of relays 143 in the telephone interface circuit 140 which, as described above with respect to FIGS. 1 and 2, controls whether the messages are sent via the radio or the telephone line 26.

The watchdog timer 142 is connected to the microcontroller 121 and hence the firmware by line PHONE 1. If it is desired to send the message over the radio, the firmware toggles line PHONE 1 ten times per second which forces the set of relays 143 to send the message over the radio.

The toggling of PHONE 1 acts as a charge pump, charging capacitor C44 of the watchdog timer 142. This keeps transistor Q4 turned on which energizes telephone snatch relays 144, thus connecting relays 146 (armature) and 148 (contact) and relays 150 (armature) and 152 (contact) of the set of relays 143. As can be seen in FIG. 7, the message is then sent to the telephone line simulator 160 when charging capacitor C44 is energized.

If it is desirable for the message to be sent over the telephone line 26, the telephone snatch relays 144 of the set of relays 143 are not activated and the circuit remains in the position shown in FIG. 7 with the message relay armatures 146 and 150 in contact with relay contacts 154 and 156, respectively. With the relays 146, 150, 154 and 156 in contact as described above, the message is sent over TELCO-T AND TELCO-R for transmission over the telephone line 26.

If the microcontroller 121 were to fail either with the PHONE 1 operating at a very high rate of speed, such that it was toggling at more than 10 times per second or simply fail to toggle at all or to toggle slower than 10 times per second then the watchdog timer 142 would stop energizing the capacitor C44. And, the message would be sent over the telephone line 26. Thus, for all practical purposes, if the microcontroller 121 were to fail, the message would be sent over the telephone line 26.

The telephone line simulator 160 simulator supplies a 12 volt signal to the existing panel 51 to simulate a telephone company's signal. While this voltage is slightly low, most existing security systems will accept this signal without tripping an alarm. However in cases where a security system needs to have 48 volts or else an alarm is tripped, the telephone line simulator 160 includes a 48 v module connector 162 (not shown). The 48 v module when connected to connector 162 boosts the voltage from 12 volts to 48 volts by the use of a DC-to-DC converter circuit.

Once the existing panel 51 decides it wants to send a message, it picks up the phone and waits three seconds for dial tone telephone line 26. After grabbing the telephone line 26, the existing panel 51 waits for a few seconds and then dials the number of the base station. The call is intercepted by telephone intercept 52 and is sent to the control processor 30. The existing panel 51 waits for an ACK tone before sending its message. If the existing panel 51 does not receive the ACK tone, it will hang up and dial again. This process will be repeated either indefinitely or until the existing panel 51 sounds an alarm, if such an alarm is present within the existing panel 51.

The seize-detect circuit 170 senses when the existing panel 51 is making a telephone call. When no telephone call is being made only nominal voltage is taken by the telephone interface circuit 140 and the voltage read by the seize-detect circuit 170 is at 12 volts. Upon the existing panel 51 picking up the telephone. The seize-detect circuit 170 notices this change and sends this information to the change task module of the firmware. It is an advantage to know immediately that the existing panel 51 has picked u the phone because the communications panel 62 must verify the radio link before allowing the existing panel 51 to communicate. This advantage provides additional security for an entry in progress.

The received signal is given first priority by providing it with a clear channel. The base station 100 gives priority to the reporting communications panel 62 (up to five reporting panels can be given such priority) and if necessary the base station 100 will all other panels.

The firmware checks to make sure that the particular existing panel 51 is one that is supposed to communicate with the communications panel 62. The phone module of the firmware instructs the telephone interface circuit 140 to send an ACK tone back to the existing panel 51 if the existing panel 51 is supposed to communicate with the communications panel 62. Upon the existing panel 51 receiving the ACK tone, it sends its message.

There are two possible ACK tones created and sent by the firmware and ACK-tone transmitter 200; the proper tone required by the existing panel 51 is generated as determined by the command module. After the ACK tone is created by the phone module, it is sent to the ACK-tone transmitter 200 where it is modulated and conditioned before being sent to the appropriate source.

The ACK tone is not sent back to the existing panel 51 until the message is received by the base station 100. Thus, if the message is not received by the base station 100, the existing panel 51 does not assume the message has been sent, thereby preserving the integrity of the existing security system and yet being transparent.

The pulse tone detect circuit 180 together with the DTMF circuitry and the firmware determine whether the existing panel 51 is sending its message in pulse or DTMF. When the existing panel 51 has not grabbed the telephone line 26, the pin out at U15C of the pulse tone receiver 180 is high as read by the phone module of the firmware. While the existing panel 51 is dialing, the pin out at U15C8 goes low which notifies the firmware that the existing panel 51 is dialing. If the transition timing from the existing panel 51 is recognized correctly as a pulse code message, the message is intercepted for transmission to the base station 100.

If the pulse tone detect circuit 180 and the DTMF detect circuit together with the firmware decides that the existing panel 51 is sending its message in DTMF, then the phone module reads the output of the DTMF receiver 190 for decoding.

If there is a valid message as determined by the firmware, the message is transmitted to the base station 100. When the base station 100 sends an acknowledge transmission to the communications panel 62, the transmitter 200 sends an ACK tone to the existing panel 51 so that it will not sound an alarm.

Figure 8:
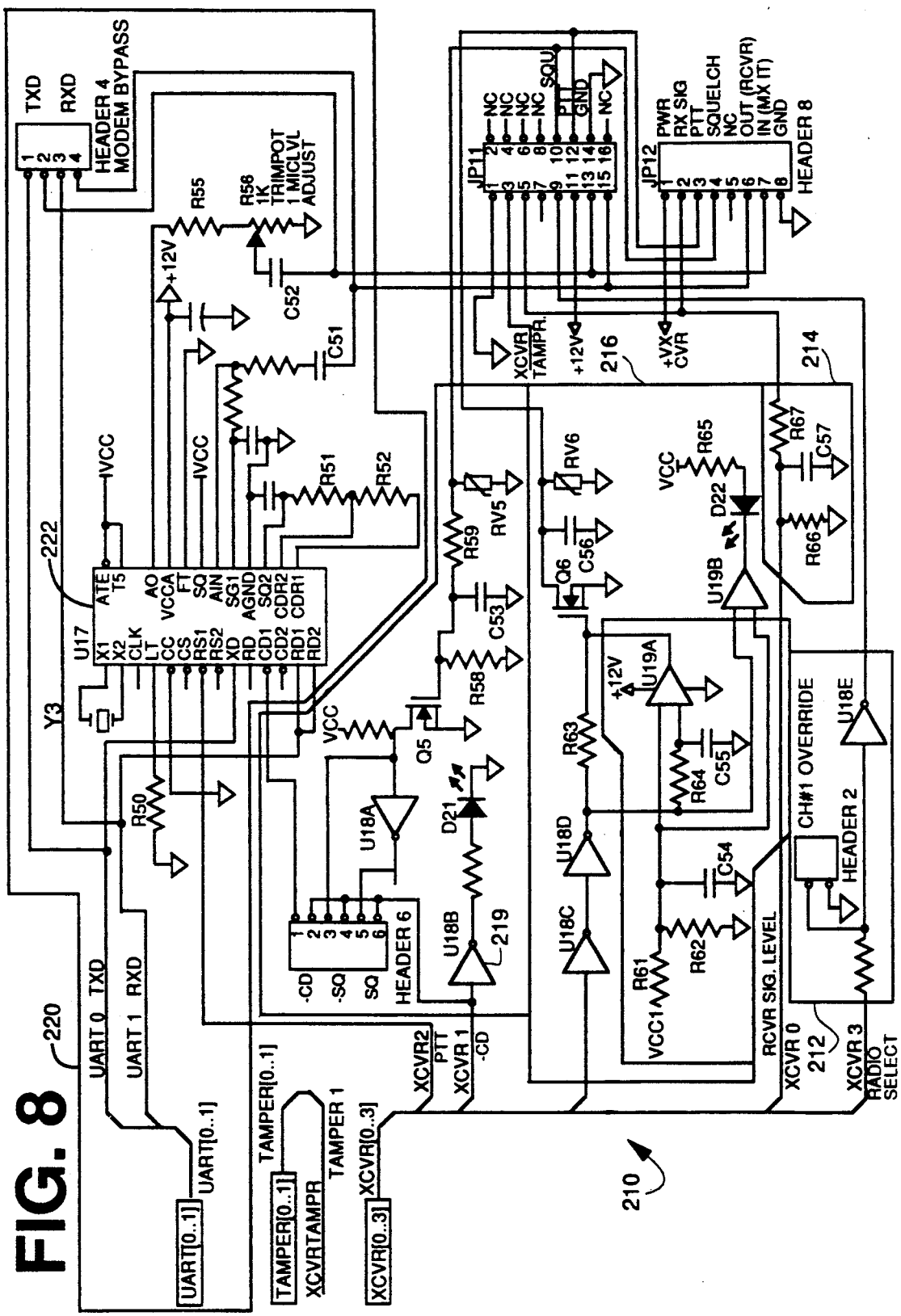
FIG. 8 is an electrical schematic of a radio modem interface circuit 210 in accordance with this invention.

With respect to FIG. 8, there is shown the circuit schematic of the radio modem interface 34 (as shown in FIGS. 1, 2), generally designated by the numeral 210. The radio modem interface 34 converts a serial digital bit stream into a form suitable for transmission over a radio and converts a radio message from the redundant transceivers 24 to a serial digital bit stream.

The radio modem interface 34 is connected to the microcontroller 121 (of FIG. 6a) by lines UARTCO 0-1 and lines XCVR 0-3. Lines TAMPER 0-1 connect to the serial input/output module 28 and detect whether there has been tampering with the transceiver interface cable or redundant transceivers 24.

The radio modem interface circuit 210 includes a switch circuit 212, a power level indicator 214, a transmitter keying circuit 216 with watchdog timer 218 for transmitting, a channel activity detector 219 and a modem circuit 220 having a modem 222.

The switch circuit 212 is a single line with a driver. The switch circuit controls which of the two channels of the redundant transceivers 24 are to be used and can switch back and forth between the redundant transceivers 24. The switch circuit 212 includes an override jumper at JP13. The override jumper JP13 forces the radio modem interface 34 to use a particular channel or transceiver even if the firmware has a different instruction. This override feature prevents the firmware from attempting to send a message over a transceiver which does not exist in the case of a one-transmitter system.

The power level indicator 214 can ascertain the health or activity of the radio channel being used. The microcontroller 121 has a number of analog to digital converters which read voltage levels as interpreted by the firmware. The power level indicator 214 is connected to the microcontroller 121 by line XCVR 0. After the microcontroller 121 has interpreted the voltage level of the channel in use, the power level of the received signal is determined. This received power level may be requested by and interpreted by the base station 100 so that channel quality may be analyzed. It will be appreciated that not all transceivers have interface connections which support the voltage level being read and hence power level indicator 214 may be ineffective with those transceivers.

The transmitter keying circuit 216 begins to transmit the message over redundant transceivers 24 when instructed to do so by the firmware via a signal on the XCVR 2 line. The watchdog timer 218 is set for several seconds because when the communications panel 62 is operating normally, no message will be more than several seconds. It is necessary to shut off a failed communications panel before it can contaminate the rest of the system.

The transmitter keying circuit 216 includes a light circuit at U19B which lights an LED when the transmitter keying circuit 216 is transmitting a message.

The transmitter keying circuit 216 includes a channel activity detector 219 for determining when the channel is being used. The channel activity detector 219 along with the firmware prevents a message from being transmitted when any other transmitter is active. When the channel is active with a received message, the channel activity detector 219 will detect such activity and the received message will be transmitted over line XCVR 1 and the receiver light D21 will be lighted.

The modem circuit 222 is connected to the microcontroller 121 by lines UART 0 & 1. UART 0 sends a message which is to be transmitted into the modem over line TXD. The message is sent from the modem 222 to the microphone line of the redundant transceivers 24 for transmission. The received message is coming from the redundant transceivers 24 to the modem 222 over the speaker line. The modem 224 sends the received message over the RXD line to UART 1 line and then to microcontroller 121.

The modem 222 performs the digital to analog conversion for the message to be transmitted. And likewise, the modem 222 performs analog to digital conversion for the received messages.

Unlike, DTMF discussed with respect to FIG. 7, the radio modem interface circuit 210 is DTSF, dual tone single frequency, because only one frequency at a time is being used to send out the message.

The PTT (push-to-talk) line instructs the transmitter to initiate transmissions over redundant transceivers 24. The firmware, through the microcontroller 121, controls the PTT line and communicates with the modem 222 over line UART 0 for transmission of the signal. The firmware does not even look at line UART 1 (received data) unless the channel activity detector 220 is active, indicating the presence of an incoming message.

Figure 9:
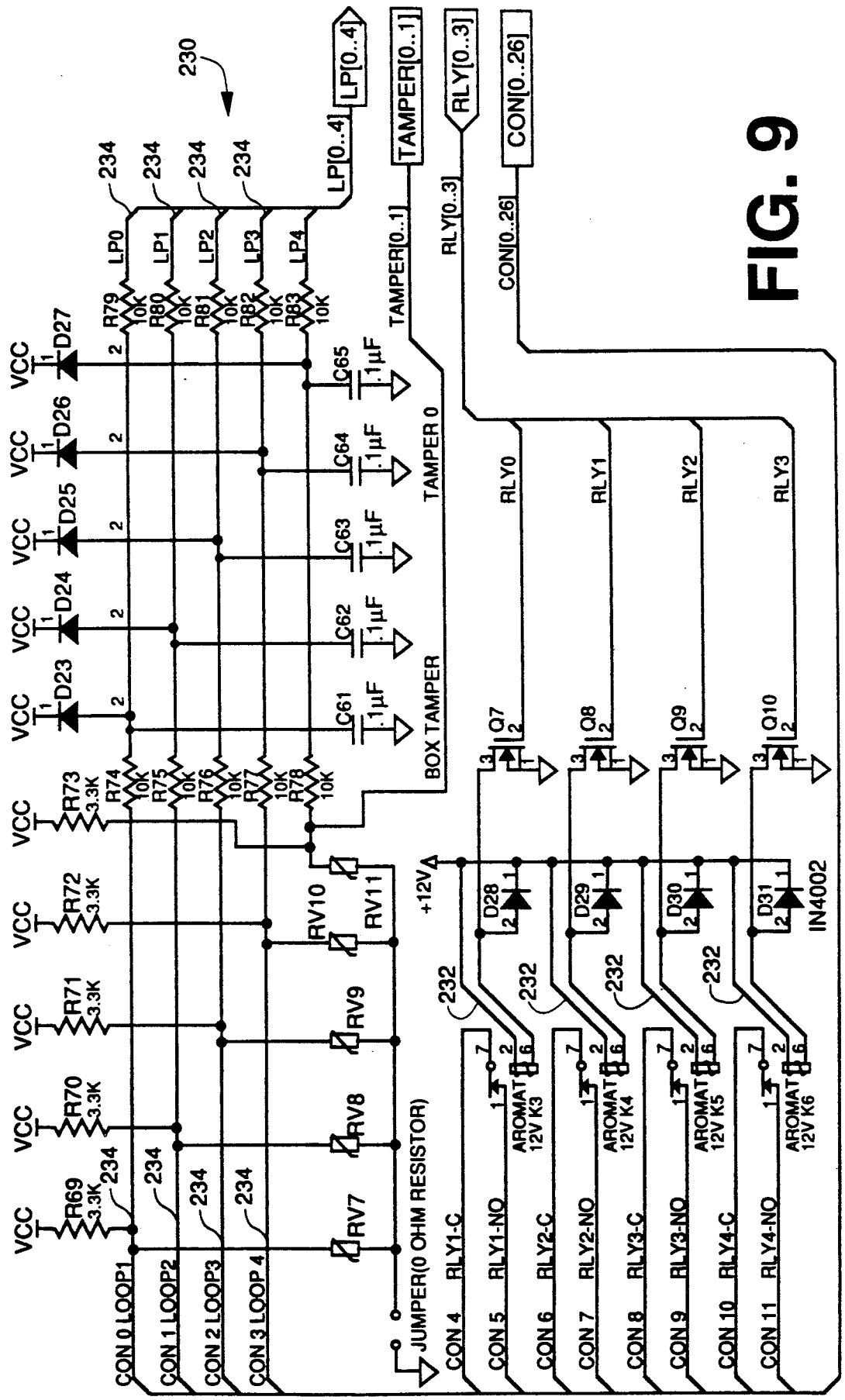
FIG. 9 is an electrical schematic of a loop inputs and relay outputs circuit in accordance with this invention.

With respect to FIG. 9, there is shown the loop inputs and relay outputs circuit of the input/output module 63 generally indicated by numeral 230.

The loop inputs and relay outputs circuit 230 includes 4 relay outputs 232. The relay outputs 232 comprise single-pole-single-throw relays which are instructed to open and close from the base station 100. The base station 100 opens and closes the relays 232 depending upon the event detected by the existing panel 51. For example, upon detecting that a door has been opened, a relay is closed to turn on a light.

The loop inputs and relay outputs circuit 230 includes 4 loop inputs 234 defining a supervised-loop-detect circuit. It will be seen that lines LOOP 1-4 corresponds to LP 0-3. The loop inputs and relay outputs circuit 230 includes a tamper circuit LP 4 which is internal to the loop inputs and relay outputs circuit 230. The tamper circuit LP 4 is connected to a switch on the lid of the physical box itself. If the box is opened without disarming the circuit LP 4, a tamper message is sent to the base station 100, alerting the operator that the box is being opened without authorization.

The loop inputs 234 receive the information from the existing panel 51 to the input/output module 63. The loop inputs 234 are powered by a power source of between 0-5 volts. The loop inputs 234 detect a wire opening up, two wires shorting together or end of line-resistive-termination in normal configuration.

In the preferred embodiment shown in FIG. 9, the supervised loop detect circuit includes 3.3K ohm resistors R69-R73 and related circuitry. With this circuitry, lines LOOP 1-4 may be connected with a Cadex-type panel which has outputs from 0-12 volts. However, the supervised loop detect circuit can not interpret end of line termination in normal configuration as with a power source of 0-5 volts. When interpreting inputs from 0-12 volt outputs, the supervised loop detect circuit only interprets 0-12 volt signals for low and high voltage. Thus, when the supervised loop detect circuit is driven by the input, the end of line resistor can not be detected.

Normally, and even preferably, the output of the relays of the existing panel 51 are read into the input/output module 63. Using the supervised loop detect circuit shown in FIG. 9, the existing panel 51 which outputs in terms of voltage can be connected to the security system 60 (FIG. 2) with success.

Figure 10:
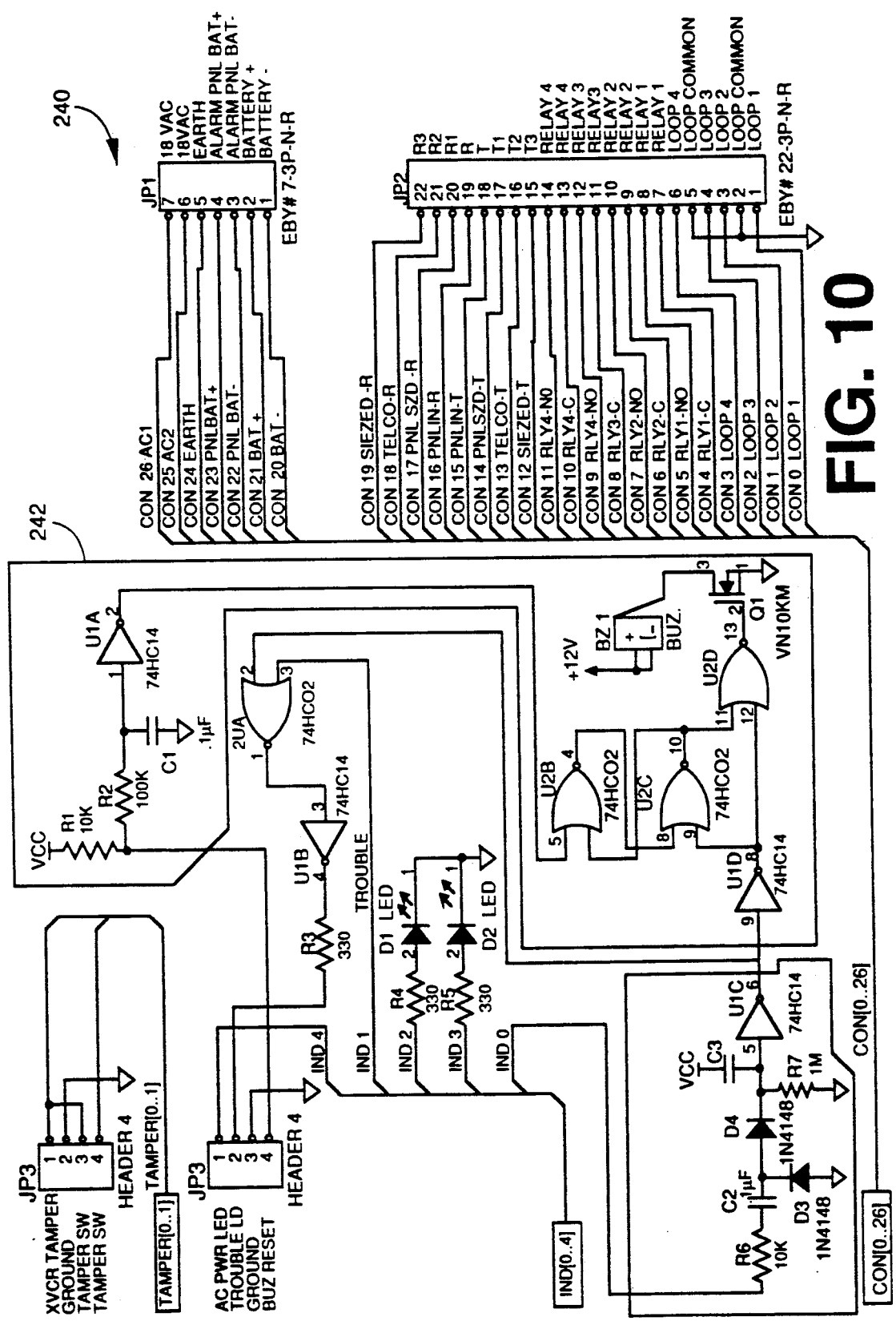
FIG. 10 is an electrical schematic of an indicators and connections circuit in accordance with this invention.

With respect to FIG. 10, an indicators and connections circuit is shown generally by the numeral 240. The indicators and connections circuit 240 includes a buzzer, driver, a cut-out circuit 242 and a watchdog circuit 244. If the communications panel 62 should fail, a buzzer BZ1 will sound and an LED D2 will light. The communications panel 62 will fail when, for example, any major component of the communications panel 62 circuit fails The watchdog circuit 244 is independent of the microcontroller 121 so that in the event that the microcontroller 121 fails the watchdog circuit 244 will still alert local operators. The watchdog circuit 244 shuts off the buzzer BZ1 when the failure condition leases to exist.

The indicators and connections circuit 240 includes two headers JP3 and JP4. The header JP3 is connected to the tamper circuit TAMPER 0-1 and works in the manner described above with respect to FIG. 9. The header JP4 includes a buzzer reset switch for de-activating the buzzer circuit after it has been turned on. The header JP4 also includes connection for LEDs D1-2, AC power LED and trouble LED.

Figure 11:
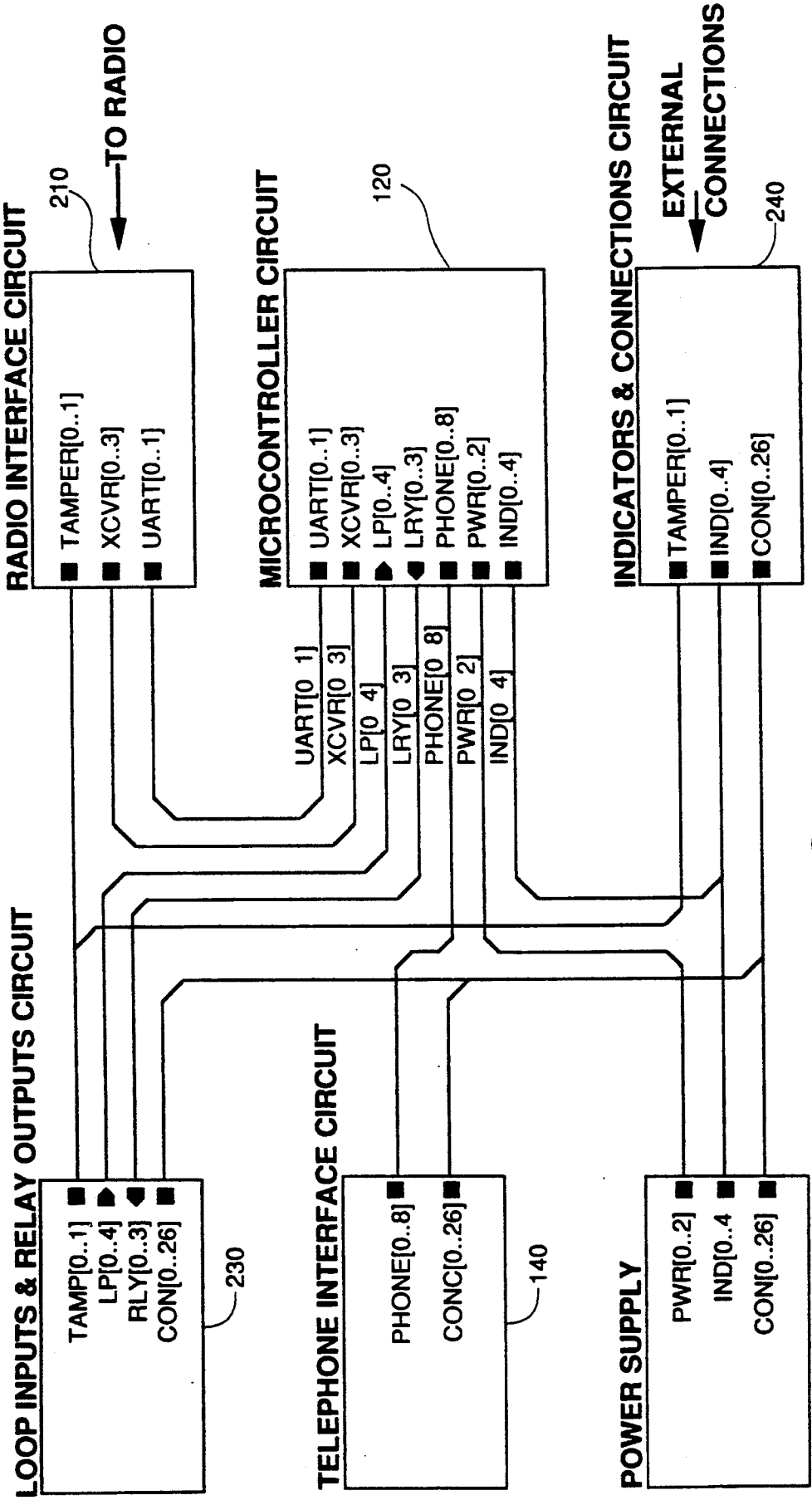
FIG. 11 is an overall electrical schematic of the electrical circuits with respect to FIGS. 6-10.

With respect to FIG. 11, there is shown the overall circuit schematic including the interconnections of the circuit schematics described above. As can be seen the major bus lines interconnect the various elements described above.

While the foregoing detailed description has described several embodiments of the security system in accordance with this invention, it is to be understood that the above description is illustrative only and not limiting of the disclosed invention. Particularly, one embodiment of the electrical circuit schematic has been shown. It will be appreciated that it would be possible to modify the control processor circuitry to include or exclude various elements within the scope and spirit of this invention. For example, the circuit of the stand alone embodiment of FIG. 1 may include a circuit similar to the circuit of FIG. 6 except that the telephone intercept of FIG. 1 is included. Other additions or deletions are also possible within the scope and spirit of this invention. Thus the invention is to be limited only by the claims as set forth below.

What is claimed is:

1. A communications system for use with an existing panel of the type which uses a telephone line as its primary communications path, the communications system providing the existing panel with a radio-frequency primary communications path, the communications system comprising:

a communications panel, including first transceiver means for use in the radio-frequency primary communications path, the communications panel adapted for receiving one or more desired conditions from one or more geographical areas, for transmitting the desired condition information and a control signal, and for receiving a control signal, over a predetermined radio frequency, the communications panel also including means for generating electrical signals; and a telephone intercept connected to the communication panel, the telephone intercept adapted for connection to the existing panel, and communicating appropriate electrical signals generated by the communications panel to make the communications panel transparent to the existing panel, whereby the communications system communicates the data and control signals of the existing panel through the radio-frequency primary communications path and is transparent to the existing panel.

2. A communications system for use with an existing panel of the type which uses a telephone line as its primary communications path, the communications system providing the existing panel with a radio-frequency primary communications path which is transparent to the existing panel, the communications system comprising:

a communications panel, including first transceiver means for use in the radio-frequency primary communications path, and a dialer interface for use in the telephone-line secondary communications path, the communications panel adapted for receiving one or more desired conditions from one or more geographical areas, for transmitting the desired condition information and a control signal, and for receiving data and an 'acknowledge' control signal via the primary communications path, the communications panel further having selection means for selecting either the primary or the secondary communications path, and the communications panel also including means for generating electrical signals;

a telephone intercept connected to the communications panel, the telephone intercept adapted for connection with the existing panel, and communication appropriate electrical signals generated by the communications panel to make the communications panel transparent to the existing panel; and a base station, including second transceiver means for receiving condition information and a control signal from the communications panel, and for transmitting information and an 'acknowledge' signal to the communications panel through the radio-frequency primary communications path, the base station also having means for receiving condition information and a control signal through the telephone-line secondary communications path, wherein the communications system communicates the data and control signals of the existing panel through the radio-frequency or telephone-line paths transparent to the existing panel.

3. A communications system for use with an existing panel of the type which uses a telephone line as its primary communications path, the communications system providing the existing panel with a radio-frequency primary communications path which is transparent to the existing panel, the communications system, comprising:

a communications panel, including first transceiver means for use in the radio-frequency primary communications path, and a dialer interface for use in the telephone-line secondary communications path, the communications panel adapted for receiving one or more desired conditions from one or more geographical areas, for transmitting the desired condition information and a control signal, and for receiving data and an 'acknowledge' control signal via the primary communications path, the communications panel further having selection means for selecting either the primary or the secondary communications path, the communications panel having means for encoding the desired conditions into messages and for transmitting the encoded messages and a control signal using an appropriate protocol and the communications panel also including means for generating electrical signals;

a telephone intercept connected to the communications panel, the telephone intercept adapted for connection with the existing panel, and communicating appropriate electrical signals generated by the communications panel to make the communications panel transparent to the existing panel; and a base station, including second transceiver means for receiving condition information and a control signal from the communications panel, and for transmitting information and an 'acknowledge' signal to the communications panel through the radio-frequency primary communications path, the base station also having means for receiving condition information and a control signal through the telephone-line secondary communications path, whereby the communications system communicates the encoded data messages and control signals, using an appropriate protocol, through the radio-frequency or telephone-line paths transparent to the existing panel.

4. A communications system as set forth in claim 1, which includes a base station, including second transceiver means for receiving condition information and a control signal and for transmitting information and a control signal to the communications panel, whereby, the base station and the communications panel are in two-way communication and wherein the communications panel includes fail safe transmission means comprising a telephone line directly connecting the communications panel and the base station.

5. A communications system as set forth in claims 1 or 2, wherein the condition information received by the communications panel is received from an existing panel via telephone line.

6. A communications system as set forth in claim 5, wherein the message forwarded to the base station from an existing panel comprises a full data transfer of information.

7. A communications system as set forth in claim 2, wherein the first transceiver means comprises at least 2 transceivers.

8. A communications system as set forth in claim 2, wherein the second transceiver means comprises at least 2 transceivers.

9. A communications system as set forth in claim 2, wherein the communications system includes a plurality of sensors connected to the control panel.

10. A communications system as set forth in claim 9, wherein the plurality of sensors are different from each other and sense a plurality of different conditions.

11. A communications system as set forth in claim 10, wherein the sensors sense smoke, temperature, building security and sensor identification.

12. A communications system as set forth in claim 9, wherein the communication panel comprises a polling means for polling each of the sensors at timed intervals.

13. A communications system as set forth in claim 12, wherein the polling means is adapted to be manually overridden through use of the control signal.

14. A communications system as set forth in claim 2, wherein the communications panel is integrated with the existing panel.

15. A communications system as set forth in claim 2, wherein there are a plurality of existing panels and the communications panel receives information from the plurality of existing panels, defining a cluster controller.

16. A communications system as set forth in claim 2, wherein the communications panel is capable of transmitting and receiving condition information and a control signal using radio frequencies over long distances.

17. A communications system as set forth in claim 2, wherein the first and second transceiver means communicate via spread spectrum.

18. A communications system as set forth in claim 2, wherein the first and second transceiver means transmit at a rate of 29.000 baud.

19. A communications system as set forth in claims 1 or 2 wherein the information sent to the base station is encoded by a predefined protocol and wherein that protocol includes an end to end acknowledgement.

* * * * *